United States Patent
Matsumura et al.

(10) Patent No.: US 9,464,206 B2
(45) Date of Patent: Oct. 11, 2016

(54) THERMOSETTING POWDER COATING MATERIAL COMPRISING POWDER PARTICLES HAVING SPECIFIC AMOUNT OF DIVALENT OR POLYVALENT METAL IONS, AND COATED ARTICLE

(71) Applicant: FUJI XEROX CO., LTD., Tokyo (JP)

(72) Inventors: Yasuo Matsumura, Kanagawa (JP); Makoto Furuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/519,599

(22) Filed: Oct. 21, 2014

(65) Prior Publication Data

US 2015/0353762 A1  Dec. 10, 2015

(30) Foreign Application Priority Data

Jun. 9, 2014 (JP) ................. 2014-118774

(51) Int. Cl.
  *B32B 5/16* (2006.01)
  *C09D 167/00* (2006.01)
  *C09D 133/00* (2006.01)

(52) U.S. Cl.
  CPC ........... *C09D 167/00* (2013.01); *C09D 133/00* (2013.01); *Y10T 428/254* (2015.01); *Y10T 428/264* (2015.01); *Y10T 428/265* (2015.01); *Y10T 428/2998* (2015.01)

(58) Field of Classification Search
  CPC ..... C09D 167/00; C08J 3/12; C08J 2400/24; Y10T 428/2998; Y10T 428/254; Y10T 428/265
  USPC ................. 428/403–407, 327, 336
  See application file for complete search history.

(56) References Cited

U.S. PATENT DOCUMENTS

| | | | |
|---|---|---|---|
| 5,356,971 A * | 10/1994 | Sagawa et al. | 524/275 |
| 5,610,269 A | 3/1997 | Sato et al. | |
| 2001/0003127 A1 | 6/2001 | Tsuda et al. | |
| 2002/0086104 A1 | 7/2002 | Yabuta et al. | |
| 2003/0170455 A1 | 9/2003 | Tsuda et al. | |
| 2004/0176554 A1 | 9/2004 | Ishida | |
| 2005/0163925 A1 * | 7/2005 | Sacripante et al. | 427/180 |
| 2005/0165133 A1 | 7/2005 | Sacripante et al. | |
| 2009/0253827 A1 * | 10/2009 | Mukai et al. | 523/201 |
| 2010/0041839 A1 * | 2/2010 | Anderson et al. | 525/535 |
| 2011/0039978 A1 * | 2/2011 | Kotani et al. | 523/218 |

FOREIGN PATENT DOCUMENTS

| | | |
|---|---|---|
| JP | 54-11936 | 1/1979 |
| JP | H09-100414 A | 4/1997 |
| JP | H09-151337 A | 6/1997 |
| JP | H09-165535 A | 6/1997 |
| JP | 10-130546 A | 5/1998 |
| JP | 11-302568 | 11/1999 |
| JP | 2001-106959 A | 4/2001 |
| JP | 2001-152082 A | 6/2001 |
| JP | 2003-082273 A | 3/2003 |
| JP | 2003-128994 A | 5/2003 |
| JP | 2004-198752 A | 7/2004 |
| JP | 2005-211900 A | 8/2005 |
| JP | 2005-213507 A | 8/2005 |
| JP | 2006-111853 A | 4/2006 |
| JP | 2008-106132 A | 5/2008 |
| JP | 2009-040893 A | 2/2009 |
| JP | 2012-128008 A | 7/2012 |
| JP | 2015-131930 A | 7/2015 |

OTHER PUBLICATIONS

Online translation of JP 54-011936 (1979).*
Online translation of JP 2003-082273 (2003).*
Online translation of JP 2006-111853 (2006).*
Nov. 4, 2015 Office Action issued in Japanese Application No. 2014-118774.
Mar. 29, 2016 Decision of Refusal issued in Japanese Application No. 2014-118774.

* cited by examiner

*Primary Examiner* — Holly Le
(74) *Attorney, Agent, or Firm* — Oliff PLC

(57) ABSTRACT

A thermosetting powder coating material includes powder particles that contain a core containing a thermosetting resin and a thermosetting agent, and a resin coating portion for coating a surface of the core, and of which a volume particle size distribution index GSDv is equal to or smaller than 1.50 and an average circularity is equal to or greater than 0.96.

13 Claims, No Drawings

THERMOSETTING POWDER COATING MATERIAL COMPRISING POWDER PARTICLES HAVING SPECIFIC AMOUNT OF DIVALENT OR POLYVALENT METAL IONS, AND COATED ARTICLE

CROSS-REFERENCE TO RELATED APPLICATIONS

This application is based on and claims priority under 35 USC 119 from Japanese Patent Application No. 2014-118774 filed Jun. 9, 2014.

BACKGROUND

1. Technical Field

The present invention relates to a thermosetting powder coating material and a coated article.

2. Related Art

In recent years, since a small amount of volatile organic compounds (VOC) is discharged in a coating step and a powder coating material which is not attached to a material to be coated can be collected and reused after the coating, a powder coating technology using a powder coating material is given attention from the viewpoint of a global environment. Accordingly, various powder coating materials are being investigated.

SUMMARY

According to an aspect of the invention, there is provided a thermosetting powder coating material including: powder particles that contain a core containing a thermosetting resin and a thermosetting agent, and a resin coating portion for coating a surface of the core, and of which a volume particle size distribution index GSDv is equal to or smaller than 1.50 and an average circularity is equal to or greater than 0.96.

DETAILED DESCRIPTION

Hereinafter, exemplary embodiments as examples of the invention will be described in detail.

Thermosetting Powder Coating Material

A thermosetting powder coating material according to the exemplary embodiment (hereinafter, also referred to as a "powder coating material") includes powder particles having a core containing a thermosetting resin and a thermosetting agent, and a resin coating portion for coating a surface of the core.

A volume particle size distribution index GSDv of the powder particles is equal to or smaller than 1.50 and an average circularity of the powder particles is equal to or greater than 0.96.

The powder coating material according to the exemplary embodiment may be any of a transparent powder coating material (clear coating material) not containing a colorant in the powder particles, and a colored powder coating material containing a colorant in the powder particles.

With the configurations described above, the powder coating material according to the exemplary embodiment forms a coating film having high smoothness with a small amount of the powder coating material and has excellent storage properties, even when the diameter of the powder particles is decreased. The reason thereof is not clear but the following may be considered.

First of all, recently, in coating with the powder coating material, it is necessary to form a thin coating film with a small amount of the powder coating material. Accordingly, it is necessary to decrease the diameter of the powder particles of the powder coating material. However, if the diameter of the powder particles is decreased by a kneading and pulverizing method, particle size distribution increases, and a large amount of coarse powder and fine powder is easily generated. In addition, irregular shapes are easily obtained for the powder particles.

If there is a large amount of the coarse powder in the powder particles, concavities and convexities are formed on the surface of the coating film, and a coating film having low smoothness is easily obtained due to coarse powder. If there is a large amount of the fine powder in the powder particles, fluidity of the powder particles decreases, aggregation between the powder particles easily occurs, and accordingly, a coating film having low smoothness is easily obtained. If irregular shapes are obtained for the powder particles, fluidity of the powder particles decreases, aggregation (blocking) between the powder particles easily occurs, and accordingly, a coating film having low smoothness is easily obtained. In addition, if irregular shapes are obtained for the powder particles, a large number of gaps between the powder particles are obtained when the powder particles are attached onto a surface to be coated. As a result, concavities and convexities are formed on the surface of the coating film after the heating, and a coating film having low smoothness is easily obtained.

Herein, a volume particle size distribution index GSDv of the powder particles is equal to or smaller than 1.50. That is, particle size distribution of the powder particles is narrowed, and coarse powder and fine powder are decreased. Accordingly, even when the diameter of the powder particle is decreased, a decrease in fluidity and aggregation (blocking) between powder particles are also prevented.

An average circularity of the powder particles is set to be equal to or greater than 0.96, and the shape of the powder particle is set to be a shape close to a sphere. That is, even when the diameter of the powder particle is decreased, a decrease in fluidity is prevented. In addition, a contact area between the powder particles is decreased, and when the powder particles are attached onto the surface to be coated, the gaps between the powder particles are decreased.

Meanwhile, when the diameter of the powder particles is decreased, a distance from the inner portion of the powder particles to the surfaces is shortened. As a result, a phenomenon of precipitation of inclusions (a thermosetting agent, and additives such as a colorant, a leveling agent, and a flame retardant which are added in addition to the thermosetting agent, if necessary) in the powder particle (hereinafter, also referred to as "bleeding") easily occurs with time. If bleeding occurs, aggregation (blocking) between the powder particles occurs, and the storage property is degraded.

Herein, a particle including a core which is a particle containing a thermosetting resin and a thermosetting agent (that is, a particle functioning as the powder coating material) and a resin coating portion on a surface of the core is used as the powder particle. When the powder particle has this layer configuration, the resin coating portion functions as a partition wall, and the bleeding of the inclusion such as the thermosetting agent contained in the core to the surface of the powder particle is prevented.

As described above, it is considered that the powder coating material according to the exemplary embodiment forms the coating film having high smoothness with a small amount of the powder coating material and has excellent storage properties, even when the diameter of the powder particles is decreased.

Since the powder coating material according to the exemplary embodiment forms the coating film having high smoothness with a small amount of the powder coating material even when the diameter of the powder particles is decreased, glossiness of the obtained coating film is also increased.

In addition, since the powder coating material according to the exemplary embodiment has excellent storage properties, the coating film having high smoothness with a small amount of the powder coating material is formed in the same manner as described above, even when the powder coating material not attached to the surface to be coated is reused after the powder coating. Accordingly, the powder coating material according to the exemplary embodiment also has long lifetime. Since the powder coating material according to the exemplary embodiment has high fluidity, high transportation efficiency and coating efficiency and excellent coating workability are obtained.

Hereinafter, the powder coating material according to the exemplary embodiment will be described in detail.

The powder coating material according to the exemplary embodiment includes the powder particles. The powder coating material may include an external additive which is attached to the surface of the powder particle, if necessary, in order to improve fluidity.

Powder Particles

The powder particle includes a core and a resin coating portion attached to the surface of the core. That is, the powder particle is a particle having a core/shell structure.

Property of Powder Particles

The volume particle size distribution index GSDv of the powder particles is equal to or smaller than 1.50, preferably equal to or smaller than 1.40, and more preferably equal to or smaller than 1.30, from viewpoints of smoothness of the coating film and the storage properties of the powder coating material.

A volume average particle diameter D50v of the powder particles is preferably from 1 μm to 25 μm, more preferably from 2 μm to 20 μm, and even more preferably from 3 μm to 15 μm, in order to forma coating film having high smoothness with a small amount of the powder coating material.

The average circularity of the powder particles is equal to or greater than 0.96, preferably equal to or greater than 0.97, and even more preferably equal to or greater than 0.98, from viewpoints of smoothness of the coating film and the storage properties of the powder coating material.

Herein, the volume average particle diameter D50v and the volume particle size distribution index GSDv of the powder particles are measured with a Coulter Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkyl benzene sulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter of 2 μm to 60 μm is measured by a Coulter Multisizer II using an aperture having an aperture diameter of 100 μm. 50,000 particles are sampled.

Cumulative distributions by volume are drawn from the side of the smallest diameter with respect to particle size ranges (channels) separated based on the measured particle size distribution. The particle diameter when the cumulative percentage becomes 16% is defined as that corresponding to a volume average particle diameter D16v, while the particle diameter when the cumulative percentage becomes 50% is defined as that corresponding to a volume average particle diameter D50v. Furthermore, the particle diameter when the cumulative percentage becomes 84% is defined as that corresponding to a volume average particle diameter D84v.

A volume average particle size distribution index (GSDv) is calculated as $(D84v/D16v)^{1/2}$.

The average circularity of the powder particles is measured by using a flow type particle image analyzer "FPIA-3000 (manufactured by Sysmex Corporation)". Specifically, 0.1 ml to 0.5 ml of a surfactant (alkyl benzene sulfonate) as a dispersant is added into 100 ml to 150 ml of water obtained by removing impurities which are solid matter in advance, and 0.1 g to 0.5 g of a measurement sample is further added thereto. A suspension in which the measurement sample is dispersed is subjected to a dispersion process with an ultrasonic dispersion device for 1 minute to 3 minutes, and concentration of the dispersion is from 3,000 particles/μl to 10,000 particles/μl. Regarding this dispersion, the average circularity of the powder particles is measured by using the flow type particle image analyzer.

Herein, the average circularity of the powder particles is a value obtained by acquiring a circularity (Ci) of each of n particles measured for the powder particles and then calculated by the following equation. However, in the following equation, Ci represents a circularity (=circumference length of a circle equivalent to a projected area of the particle/circumference length of a particle projection image), and fi represents frequency of the powder particles.

$$\text{Average circularity }(Ca) = \left(\sum_{i=1}^{n}(Ci \times fi)\right) \bigg/ \sum_{i=1}^{n}(fi) \qquad \text{Expression 1}$$

Core

The core contains a thermosetting resin and a thermosetting agent. The core may contain other additives such as a colorant, if necessary.

Thermosetting Resin

The thermosetting resin is a resin including a thermosetting reaction group. In the related art, as the thermosetting resin, various types of resin used in the powder particles of the powder coating material are used.

The thermosetting resin may preferably be a water-insoluble (hydrophobic) resin. When the water-insoluble (hydrophobic) resin is used as the thermosetting resin, environmental dependence of a charging property of the powder coating material (powder particle) is decreased. When preparing the powder particle by an aggregation and coalescence method, the thermosetting resin is preferably a water-insoluble (hydrophobic) resin, in order to realize emulsification and dispersion in an aqueous medium. The water-insolubility (hydrophobicity) means a dissolved amount of a target material with respect to 100 parts by weight of water at 25° C. is less than 5 parts by weight.

Among the thermosetting resins, at least one kind selected from the group consisting of a thermosetting (meth)acrylic resin and a thermosetting polyester resin is preferable.

Thermosetting (Meth)Acrylic Resin

The thermosetting (meth)acrylic resin is a (meth)acrylic resin including a thermosetting reaction group. For the introduction of the thermosetting reaction group to the thermosetting (meth)acrylic resin, a vinyl monomer including a thermosetting reaction group may preferably be used. The vinyl monomer including a thermosetting reaction group may be a (meth)acrylic monomer (monomer having a (meth)acryloyl group), or may be a vinyl monomer other than the (meth)acrylic monomer.

Examples of the thermosetting reaction group of the thermosetting (meth)acrylic resin include an epoxy group, a carboxylic group, a hydroxyl group, an amide group, an amino group, an acid anhydride group, a (block) isocyanate group, and the like. Among these, as the thermosetting reaction group of the (meth)acrylic resin, at least one kind selected from the group consisting of an epoxy group, a carboxylic group, and a hydroxyl group is preferable, from the viewpoint of ease of preparation of the (meth)acrylic resin. Particularly, from the viewpoints of excellent storage stability of the powder coating material and coating film appearance, at least one kind of the thermosetting reaction group is more preferably an epoxy group.

Examples of the vinyl monomer including an epoxy group as the thermosetting reaction group include various chain epoxy group-containing monomers (for example, glycidyl (meth)acrylate, β-methyl glycidyl(meth)acrylate, glycidyl vinyl ether, and allyl glycidyl ether), various (2-oxo-1,3-oxolane) group-containing vinyl monomers (for example, (2-oxo-1,3-oxolane)methyl(meth)acrylate), various alicyclic epoxy group-containing vinyl monomers (for example, 3,4-epoxy cyclohexyl(meth)acrylate, 3,4-epoxycyclohexylmethyl(meth)acrylate, and 3,4-epoxycyclohexylethyl(meth) acrylate), and the like.

Examples of the vinyl monomer including a carboxylic group as the thermosetting reaction group include various carboxylic group-containing monomers (for example, (meth)acrylic acid, crotonic acid, itaconic acid, maleic acid, and fumaric acid), various monoesters of α,β-unsaturated dicarboxylic acid and monohydric alcohol having 1 to 18 carbon atoms (for example, monomethyl fumarate, monoethyl fumarate, monobutyl fumarate, monoisobutyl fumarate, monotert-butyl fumarate, monohexyl fumarate, monooctyl fumarate, mono 2-ethylhexyl fumarate, monomethyl maleate, monoethylmaleate, monobutyl maleate, monoisobutyl maleate, monotert-butyl maleate, monohexyl maleate, monooctyl maleate, and mono 2-ethylhexyl maleate), monoalkyl ester itaconate (for example, monomethyl itaconate, monoethyl itaconate, monobutyl itaconate, monoisobutyl itaconate, monohexyl itaconate, monooctyl itaconate, and mono 2-ethylhexyl itaconate), and the like.

Examples of the vinyl monomer including a hydroxyl group as the thermosetting reaction group include various hydroxyl group-containing (meth)acrylates (for example, 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl (meth)acrylate, polyethylene glycol mono(meth)acrylate, and polypropylene glycol mono(meth)acrylate), an addition reaction product of the various hydroxyl group-containing (meth)acrylates and ε-caprolactone, various hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various hydroxyl group-containing allyl ethers (for example, 2-hydroxyethyl (meth)allyl ether, 3-hydroxypropyl(meth)allyl ether, 2-hydroxypropyl(meth)allyl ether, 4-hydroxybutyl(meth)allyl ether, 3-hydroxybutyl(meth)allyl ether, 2-hydroxy-2-methylpropyl(meth)allyl ether, 5-hydroxypentyl(meth)allyl ether, and 6-hydroxyhexyl(meth)allyl ether), an addition reaction product of the various hydroxyl group-containing allyl ethers and ε-caprolactone, and the like.

In the thermosetting (meth)acrylic resin, another vinyl monomer not including a thermosetting reaction group may be copolymerized, in addition to the (meth)acrylic monomer.

Examples of the other vinyl monomer include various α-olefins (for example, ethylene, propylene, and butene-1), various halogenated olefins except fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth) acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane, and γ-(meth) acryloyloxypropyl methyldimethoxysilane), various vinyl aliphatic carboxylate (for example, vinyl acetate, vinyl propionate, vinyl butyrate, vinyl isobutyrate, vinyl caproate, vinyl caprylate, vinyl caprate, vinyl laurate, branched vinyl aliphatic carboxylate having 9 to 11 carbon atoms, and vinyl stearate), various vinyl ester of carboxylic acid having a cyclic structure (for example, cyclohexane carboxylic acid vinyl, methylcyclohexane carboxylic acid vinyl, vinyl benzoate, and p-tert-butyl vinyl benzoate), and the like.

In the thermosetting (meth)acrylic resin, in the case of using a vinyl monomer other than the (meth)acrylic monomer, as the vinyl monomer including a thermosetting reaction group, an acrylic monomer not including a thermosetting reaction group is used.

Examples of the acrylic monomer not including a thermosetting reaction group include alkyl ester(meth)acrylate (for example, methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, n-hexyl(meth)acrylate, cyclohexyl(meth)acrylate, 2-ethylhexyl(meth)acrylate, n-octyl(meth)acrylate, isooctyl (meth)acrylate, 2-ethyloctyl(meth)acrylate, dodecyl(meth) acrylate, isodecyl(meth)acrylate, lauryl(meth)acrylate, and stearyl(meth)acrylate), various aryl ester(meth)acrylates (for example, benzyl(meth)acrylate, phenyl(meth)acrylate, and phenoxyethyl(meth)acrylate), various alkyl carbitol(meth) acrylates (for example, ethyl carbitol(meth)acrylate), other various ester(meth)acrylates (for example, isobornyl(meth) acrylate, dicyclopentanyl(meth)acrylate, dicyclopentenyl (meth)acrylate, dicyclopentenyloxyethyl(meth)acrylate, and tetrahydrofurfuryl(meth)acrylate), various amino group-containing amide unsaturated monomers (for example, N-dimethylaminoethyl(meth)acrylamide, N-diethylaminoethyl (meth)acrylamide, N-dimethylaminopropyl(meth) acrylamide, and N-diethylamino propyl(meth)acrylamide), various dialkylaminoalkyl(meth)acrylates (for example, dimethylaminoethyl(meth)acrylate and diethylaminoethyl (meth)acrylate), various amino group-containing monomers (for example, tert-butylaminoethyl(meth)acrylate, tert-butylaminopropyl(meth)acrylate, aziridinylethyl(meth)acrylate, pyrrolidinylethyl(meth)acrylate, and piperidinylethyl(meth) acrylate), and the like.

The thermosetting (meth)acrylic resin is preferably an acrylic resin having a number average molecular weight of from 1,000 to 20,000 (more preferably from 1,500 to 15,000).

When the number average molecular weight thereof is in the range described above, smoothness and mechanical properties of the coating film are easily improved.

The number average molecular weight of the thermosetting (meth)acrylic resin is measured by gel permeation chromatography (GPC). The molecular weight measurement by GPC is performed with a THF solvent using HLC-8120 GPC, which is GPC manufactured by Tosoh Corporation as a measurement device and TSKgel Super HM-M (15 cm), which is a column manufactured by Tosoh Corporation. The weight average molecular weight and the number average molecular weight are calculated using a calibration curve of molecular weight created with a monodisperse polystyrene standard sample from results of this measurement.

Thermosetting Polyester Resin

The thermosetting polyester resin is, for example, a polycondensate obtained by polycondensing at least polybasic acid and polyol. The introduction of the thermosetting reaction group to the thermosetting polyester resin is performed by adjusting an amount of polybasic acid and polyol used. With this adjustment, a thermosetting polyester resin including at least one of a carboxylic group and a hydroxyl group as a thermosetting reaction group is obtained.

Examples of polybasic acid include terephthalic acid, isophthalic acid, phthalic acid, methylterephthalic acid, trimellitic acid, pyromellitic acid, or anhydrides thereof; succinic acid, adipic acid, azelaic acid, sebacic acid, or anhydrides thereof; maleic acid, itaconic acid, or anhydrides thereof; fumaric acid, tetrahydrophthalic acid, methyltetrahydrophthalic acid hexahydrophthalic acid, methylhexahydrophthalic acid, or anhydrides thereof; cyclohexane dicarboxylic acid, 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by polycondensing other monomer in addition to polybasic acid and polyol.

Examples of the other monomer include a compound including both a carboxylic group and a hydroxyl group in one molecule (for example, dimethanol propionic acid and hydroxy pivalate), a monoepoxy compound (for example, glycidyl ester of branched aliphatic carboxylic acid such as "Cardura E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor oil fatty acid, coconut oil fatty acid, and soybean oil fatty acid), and the like.

The structure of the thermosetting polyester resin may be a branched structure or a linear structure.

Regarding the thermosetting polyester resin, the total of an acid value and a hydroxyl value is preferably from 10 mgKOH/g to 250 mgKOH/g, and the number average molecular weight is preferably from 1,000 to 100,000.

When the total of an acid value and a hydroxyl value is in the range described above, smoothness and a mechanical property of the coating film are easily improved. When the number average molecular weight is in the range described above, smoothness and a mechanical property of the coating film are improved and storage stability of the powder coating material is easily improved.

The measurement of the acid value and the hydroxyl value of the thermosetting polyester resin is performed based on JIS K-0070-1992. In addition, the measurement of the number average molecular weight of the thermosetting polyester resin is performed in the same manner as measurement of the number average molecular weight of the thermosetting (meth)acrylic resin.

The thermosetting resin may be used alone or in combination of two or more kinds thereof.

The content of the thermosetting resin is preferably 20% by weight to 99% by weight, and more preferably from 30% by weight to 95% by weight, with respect to the entirety of the powder particles.

In the case of using the thermosetting resin as the resin of the resin coating portion, the content of the thermosetting resin means content of the entire thermosetting resin in the core and the resin coating portion.

Thermosetting Agent

The thermosetting agent is selected depending on the kinds of the thermosetting reaction group of the thermosetting resin.

When the thermosetting reaction group of the thermosetting resin is an epoxy group, specific examples of the thermosetting agent include acid such as succinic acid, glutaric acid, adipic acid, pimelic acid, suberic acid, azelaic acid, sebacic acid, dodecanedioic acid, eicosanoic diacid, maleic acid, citraconic acid, itaconic acid, glutaconic acid, phthalic acid, trimellitic acid, pyromellitic acid, tetrahydrophthalic acid, hexahydrophthalic acid, and cyclohexene-1,2-dicarboxylic acid; anhydrides thereof; urethane-modified products thereof; and the like. Among these, as the thermosetting agent, aliphatic dibasic acid is preferably from the viewpoints of a property of the coating film and storage stability, and dodecanedioic acid is particularly preferable from the viewpoint of a property of the coating film.

When the thermosetting reaction group of the thermosetting resin is a carboxyl group, examples of the thermosetting agent include various epoxy resins (for example, polyglycidyl ether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidyl esters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4- epoxy cyclohexyl)methyl adipate), hydroxy amide (for example, triglycidyl isocyanurate and β-hydroxyalkyl amide), and the like.

When the thermosetting reaction group of the thermosetting resin is a hydroxyl group, examples of the thermosetting agent include blocked polyisocyanate, aminoplast, and the like. Examples of blocked polyisocyanate include organic diisocyanate such as various aliphatic diisocyanates (for example, hexamethylene diisocyanate and trimethyl hexamethylene diisocyanate), various alicyclic diisocyanates (for example, xylylene diisocyanate and isophorone diisocyanate), various aromatic diisocyanates (for example, tolylene diisocyanate and 4,4'-diphenylmethane diisocyanate); an adduct of the organic diisocyanate and polyol, a low-molecular weight polyester resin (for example, polyester polyol), or water; a polymer of the organic diisocyanate (a polymer including isocyanurate-type polyisocyanate compound); various polyisocyanate compounds blocked by a commonly used blocking agent such as isocyanate biuret product; a self-block polyisocyanate compound having a uretdione bond in a structural unit; and the like.

The thermosetting agent may be used alone or in combination of two or more kinds thereof.

The content of the thermosetting agent is preferably from 1% by weight to 30% by weight and more preferably from 3% by weight to 20% by weight, with respect to the thermosetting resin.

When the thermosetting resin is used as the resin of the resin coating portion, the content of the thermosetting agent means content with respect to the entire thermosetting resin in the core and the resin coating portion.

Colorant

As a colorant, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolone yellow; and the like.

In addition, as the pigment, a brilliant pigment is also used. Examples of the brilliant pigment include metal powder such as a pearl pigment, aluminum powder, stainless steel powder; metallic flakes; glass beads; glass flakes; mica; and flake-like iron oxide (MIO).

The colorant may be used alone or in combination of two or more kinds thereof. In the present invention, two or more kinds of colorants may be used and one kind of the colorants is preferably a white colorant.

The content of the colorant is determined depending on types of the pigment, and the hue, brightness, and the depth required for the coating film. The content of the colorant is, for example, preferably from 1% by weight to 70% by weight and more preferably from 2% by weight to 60% by weight, with respect to the entire resin in the core and the resin coating portion.

Other Additive

As the other additive, various additives used in the powder coating material are used. Specific examples of the other additive include a surface adjusting agent (silicone oil or acrylic oligomer), a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Resin Coating Portion

The resin coating portion includes a resin. The resin coating portion may be configured only of a resin, or may include other additives (the thermosetting agent described regarding the core, or other additives). However, the resin coating portion is preferably configured only of a resin, in order to further reduce the bleeding of the powder particles. Even when the resin coating portion includes the other additives, the content of the resin is preferably equal to or greater than 90% by weight (more preferably equal to or greater than 95% by weight) with respect to the entire resin coating portion.

The resin of the resin coating portion may be a non-curable resin, or may be a thermosetting resin. However, the resin of the resin coating portion is preferably a thermosetting resin, in order to improve curing density (crosslinking density) of the coating film. When the thermosetting resin is used as the resin of the resin coating portion, as this thermosetting resin, the same thermosetting resin used for the thermosetting resin of the core is used. Particularly, when the thermosetting resin is used as the resin of the resin coating portion, the thermosetting resin is preferably at least one kind selected from the group consisting of a thermosetting (meth)acrylic resin and a thermosetting polyester resin. However, the thermosetting resin of the resin coating portion may be the same kind of resin as the thermosetting resin of the core or may be an irregular resin.

When the non-curable resin is used as the resin of the resin coating portion, the non-curable resin is preferably at least one kind selected from the group consisting of an acrylic resin and a polyester resin.

A coverage of the resin coating portion is preferably from 30% to 100% and more preferably from 50% to 100%, in order to prevent bleeding.

The coverage of the resin coating portion with respect to the surface of the powder particle is a value acquired by X-ray photoelectron spectroscopy (XPS) measurement.

Specifically, in the XPS measurement, JPS-9000MX manufactured by JEOL Ltd. is used as a measurement device, and the measurement is performed using a MgKα ray as the X-ray source and setting an accelerating voltage to 10 kV and an emission current to 30 mA.

The coverage of the resin coating portion with respect to the surface of the powder particles is quantized by peak separation of a component derived from the material of the core and a component derived from a material of the resin coating portion on the surface of the powder particles, from the spectrum obtained under the conditions described above. In the peak separation, the measured spectrum is separated into each component using curve fitted by the least square method.

As the component spectrum to be a separation base, the spectrum obtained by singly measuring the thermosetting resin, a thermosetting agent, a pigment, an additive, a coating resin used in preparation of the powder particle is used. In addition, the coverage is acquired from a ratio of a spectral intensity derived from the coating resin with respect to the total of entire spectral intensity obtained from the powder particles.

A thickness of the resin coating portion is preferably from 0.2 μm to 4 μm and more preferably from 0.3 μm to 3 μm, in order to prevent bleeding.

The thickness of the resin coating portion is a value measured by the following method. The powder particle is embedded in the epoxy resin or the like, and a sliced piece is prepared by performing cutting with a diamond knife. This sliced piece is observed using a transmission electron microscope (TEM) or the like and a plurality of images of the cross section of the powder particles are imaged. The thicknesses of 20 portions of the resin coating portion are measured from the images of the cross section of the powder particle, and an average value thereof is used. When it is difficult to observe the resin coating portion in the image of the cross section due to a clear powder coating material, it is possible to easily perform the measurement by performing dyeing and observation.

Other Component of Powder Particle

The powder particle preferably contains di- or higher-valent metal ions (hereinafter, also simply referred to as "metal ions"). The metal ions are components contained in both of the core and the resin coating portion of the powder particle. When di- or higher-valent metal ions are contained in the powder particle, ion crosslinking is formed in the powder particle by the metal ions. For example, when the polyester resin is used as the thermosetting resin of the core and the resin of the resin coating portion, a carboxylic group or a hydroxyl group of the polyester resin interacts with the metal ions and the ion crosslinking is formed. With this ion crosslinking, the bleeding of the powder particles is prevented, and the storage property is easily improved. In addition, after coating with the powder coating material, the bond of the ion crosslinking is broken due to heating at the time of thermal curing, and accordingly, the melt viscosity of the powder particle decreases and a coating film having high smoothness is easily formed.

Examples of the metal ions include divalent to quadrivalent metal ions. Specifically, as the metal ions, at least one kind of metal ion selected from the group consisting of aluminum ions, magnesium ions, iron ions, zinc ions, and calcium ions is used.

As a supply source of the metal ion (compound added to the powder particle as an additive), metal salt, an inorganic metal salt polymer, a metal complex, and the like are used, for example. For example, when preparing the powder particle by an aggregation and coalescence method, the metal salt and the inorganic metal salt polymer are added to the powder particle as an aggregating agent.

Examples of the metal salt include aluminum sulfate, aluminum chloride, magnesium chloride, magnesium sulfate, ferrous chloride (II), zinc chloride, calcium chloride, calcium sulfate, and the like.

Examples of the inorganic metal salt polymer include polyaluminum chloride, polyaluminum hydroxide, iron polysulfate (II), calcium polysulfide, and the like.

Examples of the metal complex include metal salt of an aminocarboxylic acid and the like. Specific examples of the metal complex include metal salt (for example, calcium salt, magnesium salt, iron salt, and aluminum salt) using a well known chelate as a base such as ethylenediamine tetraacetic acid, propanediamine tetraacetic acid, nitrilotriacetic acid, triethylenetetramine hexaacetic acid, diethylenetriamine pentaacetic acid, and the like.

Such a supply source of the metal ions may not be added for use as an aggregating agent, but may be added simply as an additive.

As the valence of the metal ions is high, mesh ion crosslinking is easily formed, and it is preferable from the viewpoints of smoothness of the coating film and the storage properties of the powder coating material. Accordingly, the metal ions are preferably Al ions. That is, the supply source of the metal ions is preferably aluminum salt (for example, aluminum sulfate or aluminum chloride), or an aluminum salt polymer (for example, polyaluminum chloride or polyaluminum hydroxide). Among the supply sources of the metal ions, the inorganic metal salt polymer is preferable, compared to the metal salt, even though the valences of the metal ions thereof are the same as each other, from the viewpoints of smoothness of the coating film and the storage properties of the powder coating material. Accordingly, the supply source of the metal ions is particularly preferably an aluminum salt polymer (for example, polyaluminum chloride or polyaluminum hydroxide).

The content of the metal ions is preferably 0.002% by weight to 0.2% by weight and more preferably from 0.005% by weight to 0.15% by weight, with respect to the entire powder particle, from the viewpoints of smoothness of the coating film and the storage properties of the powder coating material.

When the content of the metal ions is equal to or greater than 0.002% by weight, suitable ion crosslinking is formed by the metal ions, bleeding of the powder particles is prevented, and the storage properties of the powder coating material are easily improved. Meanwhile, when the content of the metal ions is equal to or smaller than 0.2% by weight, the formation of excessive ion crosslinking by the metal ions is prevented, and the smoothness of the coating film is easily improved.

Herein, when preparing the powder particles by an aggregation and coalescence method, the supply source of the metal ions added as an aggregating agent (metal salt or metal salt polymer) contributes to controlling the particle size distribution and shapes of the powder particles.

Specifically, high valence of the metal ions is preferable, in order to obtain a narrow particle size distribution. In addition, in order to obtain a narrow particle size distribution, the metal salt polymer is preferable, compared to the metal salt, even though the valences of the metal ions thereof are the same as each other. Accordingly, from the viewpoints described above, the supply source of the metal ions is preferably aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

When the aggregating agent is added so that the content of the metal ions is equal to or greater than 0.002% by weight, aggregation of the resin particles in the aqueous medium proceeds, and this contributes to realization of the narrow particle size distribution. The aggregation of the resin particles to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, excessive ion crosslinking in the aggregated particles is prevented, and the shape of the powder particles generated when performing coalescence is easily set to be close to a sphere. Accordingly, from the viewpoints described above, the content of the metal ions is preferably from 0.002% by weight to 0.2% by weight and more preferably from 0.005% by weight to 0.15% by weight.

The content of the metal ions is measured by quantitative analysis of fluorescent X-ray intensity of the powder particles. Specifically, for example, first, the resin and the supply source of the metal ions are mixed with each other, and a resin mixture having a known concentration of the metal ions is obtained. A pellet sample is obtained with 200 mg of this resin mixture by using a tableting tool having a diameter of 13 mm. This pellet sample is precisely weighed, and the fluorescent X-ray intensity of the pellet sample is measured, to obtain peak intensity. In the same manner as described above, the measurement is performed for the pellet sample obtained by changing the added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) a method of adjusting the content of the metal ions including, in a case of preparing the powder particles by an aggregation and coalescence method, adding the aggregating agent (for example, metal salt or the metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming the metal ions and a complex by the chelating agent, and removing the formed complex salt in a washing step.

External Additive

Since an external additive prevents occurrence of aggregation between the powder particles, it is possible to form a coating film having high smoothness with a small amount thereof. Specific examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more kinds thereof.

Generally, the amount of the hydrophobizing agent is, for example, from 1 part by weight to 10 parts by weight with respect to 100 parts by weight of the inorganic particles.

The amount of the external additive externally added is, for example, preferably from 0.01% by weight to 5% by weight and more preferably from 0.01% by weight to 2.0% by weight, with respect to the powder particles.

Manufacturing Method of Powder Coating Material

Next, a manufacturing method of the powder coating material according to the exemplary embodiment will be described.

After manufacturing the powder particles, the powder coating material according to the exemplary embodiment is obtained by externally adding the external additives to the powder particles, if necessary.

The powder particles may be manufactured using any of a dry manufacturing method (e.g., kneading and pulverization method) and a wet manufacturing method (e.g., aggregation and coalescence method, suspension and polymerization method, and dissolution and suspension method). The powder particle manufacturing method is not particularly limited to these manufacturing methods, and a known manufacturing method is employed.

Among these, the powder particles are preferably obtained by an aggregation and coalescence method, in order to easily control the volume particle size distribution index GSDv and the average circularity to be in the range described above.

Specifically, the powder particles are preferably manufactured by performing: a step of forming first aggregated particles by aggregating first resin particles and a thermosetting agent in a dispersion in which the first resin particles containing a thermosetting resin, and the thermosetting agent are dispersed, or by aggregating composite particles in a dispersion in which composite particles containing a thermosetting resin and a thermosetting agent are dispersed; a step of forming second aggregated particles by mixing a first aggregated particle dispersion in which the first aggregated particles are dispersed and a second resin particle dispersion in which second resin particles containing the resin are dispersed, with each other, aggregating the second resin particles on the surface of the first aggregated particles, and forming second aggregated particles in which the second resin particles are attached to the surface of the first aggregated particles; and a step of heating a second aggregated particle dispersion in which the second aggregated particles are dispersed to coalesce the second aggregated particles.

In the powder particle manufactured by this aggregation and coalescence method, a portion where the first aggregated particles are coalesced is the core, and portion where the second resin particles attached to the surface of the first aggregated particles are coalesced is the resin coating portion.

Hereinafter, the respective steps will be described in detail.

In the following description, a manufacturing method of powder particles containing a colorant will be described, but the colorant is only used if necessary.

Dispersion Preparation Step

First, each dispersion used in the aggregation and coalescence method is prepared. Specifically, a first resin particle dispersion in which first resin particles containing the thermosetting resin of the core are dispersed, a thermosetting agent dispersion in which the thermosetting agent is dispersed, a colorant dispersion in which the colorant is dispersed, and a second resin particle dispersion in which second resin particles containing the resin of the resin coating portion are dispersed, are prepared.

In addition, a composite particle dispersion in which the composite particles containing the thermosetting resin and the thermosetting agent of the core are dispersed is prepared, instead of the first resin particle dispersion and the thermosetting agent dispersion in which the thermosetting agent is dispersed.

In the dispersion preparation step, the first resin particles, the second resin particles, and the composite particles are collectively described as the "resin particles".

Herein, a resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more kinds thereof.

Examples of the surfactant include anionic surfactants such as sulfuric ester salt-based, sulfonate-based, phosphate ester-based, and soap-based anionic surfactants; cationic surfactants such as amine salt-based and quaternary ammonium salt-based cationic surfactants; and nonionic surfactants such as polyethylene glycol-based, alkyl phenol ethylene oxide adduct-based, and polyol-based nonionic surfactants. Among these, anionic surfactants and cationic surfactants are particularly used. Nonionic surfactants may be used in combination with anionic surfactants or cationic surfactants.

The surfactants may be used alone or in combination of two or more kinds thereof.

Regarding the resin particle dispersion, as a method of dispersing the resin particles in the dispersion medium, a common dispersing method using, for example, a rotary shearing-type homogenizer, or a ball mill, a sand mill, or a Dyno mill having media is exemplified. Depending on the kind of the resin particles, the resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding abase to an organic continuous phase (O phase); and converting the resin (so-called phase inversion) from W/O to O/W by adding an aqueous medium (W phase) to form a discontinuous phase, thereby dispersing the resin as particles in the aqueous medium.

In the manufacturing method of the resin particle dispersion, specifically, for example, in the case of manufacturing an acrylic resin particle dispersion, a raw material monomer is emulsified in water of an aqueous medium, and a water-soluble initiator, and if necessary, a chain transfer agent for controlling molecular weight are added thereto and the obtained mixture is heated to perform emulsification and polymerization, and accordingly a resin particle dispersion in which the acrylic resin particles are dispersed is obtained.

In the case of manufacturing a polyester resin particle dispersion, after performing heating, melting, and polycondensing under reduced pressure with respect to a raw material monomer, a solvent (for example, ethyl acetate) is added to dissolve the obtained polycondensation product therein, and the obtained solution is stirred while adding a weak alkaline aqueous solution thereto, and subjected to phase inversion emulsification, and accordingly, a resin particle dispersion in which the polyester resin particles are dispersed is obtained.

In addition, in the case of obtaining the composite particle dispersion, the resin and the thermosetting agent are mixed with each other, and are dispersed (for example, subjected to emulsification such as phase inversion emulsification) in a dispersion medium, and accordingly the composite particle dispersion is obtained.

The volume average particle diameter of the resin particles dispersed in the resin particle dispersion is, for example, preferably equal to or smaller than 1 μm, more preferably from 0.01 μm to 1 μm, even more preferably from 0.08 μm to 0.8 μm, and still more preferably from 0.1 μm to 0.6 μm.

Regarding the volume average particle diameter of the resin particles, a cumulative distribution by volume is drawn from the side of the smallest diameter with respect to particle size ranges (channels) separated using the particle size distribution obtained by the measurement with a laser diffraction-type particle size distribution measuring device (for example, LA-700 manufactured by Horiba, Ltd.), and a particle diameter when the cumulative percentage becomes 50% with respect to the entire particles is measured as a volume average particle diameter D50v. The volume average particle diameter of the particles in other dispersions is also measured in the same manner.

The content of the resin particles contained in the resin particle dispersion is, for example, preferably from 5% by weight to 50% by weight, and more preferably from 10% by weight to 40% by weight.

For example, the thermosetting agent dispersion, the colorant dispersion, and the composite particle dispersion are also prepared in the same manner as in the case of the resin particle dispersion. That is, the resin particles in the resin particle dispersion are the same as the particles of the colorant dispersed in the colorant dispersion, the particles of the thermosetting agent dispersed in the thermosetting agent dispersion, and the composite particles dispersed in the composite particle dispersion, in terms of the volume average particle diameter, the dispersion medium, the dispersing method, and the content of the particles.

First Aggregated Particle Forming Step

Next, the first resin particle dispersion, the thermosetting agent dispersion, and the colorant dispersion are mixed with each other.

The first resin particles, the thermosetting agent, and the colorant are heterogeneously aggregated in the mixed dispersion, thereby forming first aggregated particles having a diameter near a target powder particle diameter and including the first resin particles, the thermosetting agent, and the colorant.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature of a glass transition temperature of the first resin particles (specifically, for example, from a temperature 30° C. lower than the glass transition temperature of the first resin particles to a temperature 10° C. lower than the glass transition temperature thereof) to aggregate the particles dispersed in the mixed dispersion, thereby forming the first aggregated particles.

In the first aggregated particle forming step, the first aggregated particles may be formed by mixing the composite particle dispersion including the thermosetting resin and the thermosetting agent, and the colorant dispersion with each other and heterogeneously aggregating the composite particles and the colorant in the mixed dispersion.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant used as the dispersing agent to be added to the mixed dispersion, metal salt, a metal salt polymer, and a metal complex. When a metal complex is used as the aggregating agent, the amount of the surfactant used is reduced and charging characteristics are improved.

After completing the aggregation, an additive for forming a complex or a similar bond with metal ions of the aggregating agent may be used, if necessary. A chelating agent is suitably used as this additive. With the addition of this chelating agent, the content of the metal ions of the powder particles may be adjusted, when the aggregating agent is excessively added.

Herein, the metal salt, the metal salt polymer, or the metal complex as the aggregating agent is used as a supply source of the metal ions. These examples are as described above.

A water-soluble chelating agent is used as the chelating agent. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the second resin particle dispersion.

The second resin particles may be the same kind as the first resin particles or may be an irregular kind therefrom.

Aggregation is performed such that the second resin particles are attached to the surface of the first aggregated particles in the mixed dispersion in which the first aggregated particles and the second resin particles are dispersed, thereby forming second aggregated particles in which the second resin particles are attached to the surface of the first aggregated particles.

Specifically, in the first aggregated particle forming step, for example, when the particle diameter of the first aggregated particles reaches a target particle diameter, the second resin particle dispersion is mixed with the first aggregated particle dispersion, and the mixed dispersion is heated at a temperature equal to or lower than the glass transition temperature of the second resin particles.

By setting pH of the mixed dispersion to be in a range of 6.5 to 8.5, for example, the progress of the aggregation is stopped.

Accordingly, the second aggregated particles aggregated in such a way that the second resin particles are attached to the surface of the first aggregated particles are obtained.

Coalescence Step

Next, the second aggregated particle dispersion in which the second aggregated particles are dispersed is heated at, for example, a temperature that is equal to or higher than the glass transition temperature of the first and second resin particles (for example, a temperature that is higher than the glass transition temperature of the first and second resin particles by 10° C. to 30° C.) to coalesce the second aggregated particles and form the powder particles.

The powder particles are obtained through the foregoing steps.

Herein, after the coalescence step ends, the powder particles formed in the dispersion are subjected to a washing step, a solid-liquid separation step, and a drying step, that are well known, and thus dry powder particles are obtained.

In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is manufactured by adding and mixing, for example, an external additive to the obtained dry powder particles, if necessary. The mixing is preferably performed with, for example, a V-blender, a Henschel mixer, a Lödige mixer, or the like. Furthermore, if necessary, coarse particles of the powder coating material may be removed using a vibration sieving machine, a wind classifier, or the like.

Coated Article/Manufacturing Method of Coated Article

A coated article according to the exemplary embodiment is a coated article which is coated with the powder coating material according to the exemplary embodiment. As a manufacturing method of the coated article according to the exemplary embodiment, there is a manufacturing method of the coated article which includes performing coating with the powder coating material according to the exemplary embodiment.

Specifically, after coating a surface to be coated with the powder coating material, a coating film having the powder coating material cured by heating (burning) is formed, and accordingly the coated article is obtained. The coating and the heating (burning) of the powder coating material may be performed all together.

In the coating with the powder coating material, a well-known coating method such as electrostatic powder coating, frictional charge powder coating, or fluidized dipping is used. A thickness of the coating film of the powder coating material is, for example, preferably from 30 µm to 50 µm.

A heating temperature (burning temperature) is, for example, preferably from 90° C. to 250° C., more preferably from 100° C. to 220° C., and even more preferably from 120° C. to 200° C. The heating time (burning time) is adjusted depending on the heating temperature (burning temperature).

A target product to be coated with the powder coating material is not particularly limited, and various metal components, ceramic components, or resin components are used. These target products may be products which are not yet molded to the products such as a plate-shaped product or a linear product, and may be molded products which are molded to be used in an electronic component, a road vehicle, or an interior and exterior material of a building. In addition, the target product may be a product including a surface to be coated which is subjected to a surface treatment such as a primer treatment, a plating treatment, or an electrodeposition coating, in advance.

EXAMPLES

Hereinafter, the exemplary embodiment will be described in detail using examples, but is not limited to these examples. In the following description, unless otherwise noted, "parts" and "%" are based on the weight.

Preparation of Colorant Dispersion

Preparation of Colorant Dispersion (C1)

Cyan pigment (C.I. Pigment Blue 15:3, (copper phthalocyanine) manufactured by Dainichiseika Color & Chemicals Mfg. Co., Ltd.): 100 parts by weight Anionic surfactant (NEOGEN RK manufactured by Dai-Ichi Kogyo Seiyaku Co., Ltd.): 15 parts by weight Ion exchange water: 450 parts by weight The above components are mixed with each other, dissolved, and dispersed for 1 hour using a high pressure impact type dispersing machine ULTIMIZER (HJP30006 manufactured by Sugino Machine, Ltd.), and accordingly colorant dispersion in which the cyan pigment is dispersed is prepared. A volume average particle diameter of the cyan pigment in the colorant dispersion is 0.13 µm and the solid content ratio in the colorant dispersion is 25%.

Preparation of Colorant Dispersion (M1)

Colorant dispersion (M1) is prepared by the same method as that of the colorant dispersion (C1), except for changing the cyan pigment to a magenta pigment (quinacridone pigment: CHROMOFINE MAGENTA 6887 manufactured by Dainichiseika Color & Chemicals Mfg. Co., Ltd.). A volume average particle diameter of the magenta pigment in the colorant dispersion is 0.14 µm and the solid content ratio in the colorant dispersion is 25%.

Preparation of Colorant Dispersion (M2)

Colorant dispersion (M2) is prepared by the same method as that of the colorant dispersion (C1), except for changing the cyan pigment to a magenta pigment (Fastogen Super Red 7100Y-E manufactured by DIC Corporation). A volume average particle diameter of the magenta pigment in the colorant dispersion is 0.14 µm and the solid content ratio in the colorant dispersion is 25%.

Preparation of Colorant Dispersion (Y1)

Colorant dispersion (Y1) is prepared by the same method as that of the colorant dispersion (C1), except for changing the cyan pigment to a yellow pigment (Paliotol Yellow d1155 manufactured by BASF). A volume average particle diameter of the yellow pigment in the colorant dispersion is 0.13 µm and the solid content ratio in the colorant dispersion is 25%.

Preparation of Colorant Dispersion (K1)

Colorant dispersion (K1) is prepared by the same method as that of the colorant dispersion (C1), except for changing the cyan pigment to a black pigment (Regal 330 manufactured by Cabot Corporation). A volume average particle diameter of the black pigment in the colorant dispersion is 0.11 µm and the solid content ratio in the colorant dispersion is 25%.

Preparation of Colorant Dispersion (W1)

Titanium oxide (A-220 manufactured by Ishihara Sangyo Kaisha, Ltd.): 100 parts by weight
Anionic surfactant (NEOGEN RK manufactured by Dai-Ichi Kogyo Seiyaku Co., Ltd.): 15 parts by weight
Ion exchange water: 400 parts by weight The above components are mixed with each other, dissolved, and dispersed for 3 hours using a high pressure impact type dispersing machine ULTIMIZER (HJP30006 manufactured by Sugino Machine, Ltd.), and accordingly colorant dispersion in which titanium oxide is dispersed is prepared. When performing measurement using a laser diffraction type particle size measuring device, a volume average particle diameter of titanium oxide in the colorant dispersion is 0.25 µm and the solid content ratio in the colorant dispersion is 25%.

Example 1

Clear Powder Coating Material (PCA1) Containing Acrylic Resin

Preparation of Thermosetting Acrylic Resin Particle Dispersion (A1)

Styrene: 160 parts by weight
Methyl methacrylate: 200 parts by weight
n-butyl acrylate: 140 parts by weight
Acrylic acid: 12 parts by weight
Clycidyl methacrylate: 100 parts by weight
Dodecanethiol: 12 parts by weight
A monomer solution A in which the above components are mixed and dissolved is prepared.

Meanwhile, 12 parts by weight of the anionic surfactant (Dowfax manufactured by The Dow Chemical Company) is dissolved in 280 parts by weight of ion exchange water, and the monomer solution A is added to this, and dispersed and emulsified in a flask, and accordingly a solution (monomer emulsified solution A) is obtained.

Next, 1 part by weight of the anionic surfactant (Dowfax manufactured by The Dow Chemical Company) is dissolved in 555 parts by weight of ion exchange water and is put in a flask for polymerization. After that, the flask for polymerization is tightly closed, a reflux tube is installed to introduce nitrogen, and the flask for polymerization is heated to 75° C. in a water bath while slowly stirring, and held in this state.

In this state, a solution obtained by dissolving 9 parts by weight of ammonium persulfate in 43 parts by weight of ion exchange water is added dropwise into the flask for polymerization through a metering pump for 20 minutes, and then the monomer emulsified solution A is added dropwise thereto through the metering pump for 200 minutes. After completing the dropwise adding, the flask for polymerization is held at 75° C. for 3 hours while continuously slowly stirring to complete the polymerization, and anionic thermosetting acrylic resin particle dispersion (A1) having a solid content of 42% is obtained.

Regarding the thermosetting acrylic resin particles contained in the anionic thermosetting acrylic resin particle dispersion (A1), a volume average particle diameter is 220 nm, a glass transition temperature is 55° C., and a weight average molecular weight is 24,000.

Preparation of Thermosetting Agent Dispersion (D1)

Dodecanedioic acid: 50 parts by weight
Benzoin: 1 part by weight
Acrylic oligomer (Acronal 4F manufactured by BASF): 1 part by weight
Anionic surfactant (Dowfax manufactured by The Dow Chemical Company): 5 parts by weight
Ion exchange water: 200 parts by weight The above components are heated at 140° C. in a pressure vessel, and dispersed using a homogenizer (ULTRA-TURRAX T50 manufactured by IKA Ltd.), and then are subjected to dispersion treatment with a Manton-Gaulin high pressure homogenizer (manufactured by Gaulin Co., Ltd.), and accordingly thermosetting agent dispersion (D1) (concentration of thermosetting agent: 23%) is prepared in which the thermosetting agent having an average particle diameter of 0.24 µm and the other additive are dispersed.

Preparation of Clear Powder Coating Material (PCA1)

Aggregation Step

Thermosetting acrylic resin particle dispersion (A1): 200 parts by weight (resin: 84 parts by weight)
Thermosetting agent dispersion (D1): 91 parts by weight (thermosetting agent: 21 parts by weight)
10% polyaluminum chloride: 1 part by weight The above components are sufficiently mixed and dispersed in a round stainless steel flask using a homogenizer (ULTRA-TURRAX T50 manufactured by IKA Ltd.), and heated to 48° C. while stirring in the flask in a heating oil bath. After holding the resultant material at 48° C. for 60 minutes, 68 parts by weight of the thermosetting acrylic resin particle dispersion (A1) (resin: 28.56 parts by weight) is added and the obtained mixture is gently stirred.

Coalescence Step

After that, pH in the flask is adjusted to 5.0 by 0.5 mol/liter of aqueous sodium hydroxide, and then the solution is heated to 95° C. while continuously stirring. After completing the heating of the solution in the flask to 85° C., this state is held for 4 hours. The pH when holding a temperature at 85° C. is approximately 4.0.

Filtration• Washing• Drying Step

After completing the reaction, the solution in the flask is cooled and filtered to obtain the solid content. Next, after sufficiently washing this solid content with ion exchange water, solid-liquid separation is performed by Nutsche-type suction filtration, and the solid content is obtained again.

Next, this solid content is dispersed again in 3 liters of ion exchange water at 40° C., and stirred and washed at 300 rpm for 15 minutes. This washing operation is repeated 5 times, and the solid content obtained by solid-liquid separation by Nutsche-type suction filtration is subjected to vacuum drying for 12 hours. Then, 0.5 part by weight of hydrophobic silica particles (primary particle diameter of 16 nm) is mixed as an external additive with respect to 100 parts by weight of solid content, and the clear powder coating material (PCA1) containing acrylic resin is obtained.

Regarding powder particles of the clear powder coating material, the volume average particle diameter D50v is 5.9 µm, the volume average particle size distribution index GSDv is 1.20, and the average circularity is 0.99.

The (powder particles of the) clear powder coating material are buried in an epoxy resin and cut. When an image of the cross section of the particle is observed with a transmission electron microscope, the surface of the powder particles coated with the resin coating portion is seen.

The content of aluminum ions of the powder particles of the clear powder coating material is 0.08% by weight.

Example 2

Colored Powder Coating Material (PGE1) Containing Polyester Resin

Preparation of Thermosetting Polyester Resin (PES1)

Raw materials having the following composition are put into a reaction vessel including a stirrer, a thermometer, a nitrogen gas introducing tube, and a rectifier, heated to 240° C. while stirring under a nitrogen atmosphere, and subjected to a polycondensation reaction.

Terephthalic acid: 742 parts by weight (100 mol %)
Neopentyl glycol: 312 parts by weight (62 mol %)
Ethylene glycol: 59.4 parts by weight (20 mol %)
Glycerin: 90 parts by weight (18 mol %)
di-n-butyl tin oxide: 0.5 part by weight Regarding the obtained thermosetting polyester resin, the glass transition temperature is 55° C., the acid value (Av) is 8 mgKOH/g, the hydroxyl value (OHv) is 70 mgKOH/g, the weight average molecular weight is 26,000, and the number average molecular weight is 8,000.

Preparation of Composite Particle Dispersion (E1)

While maintaining a 3-liter jacketed reaction vessel (BJ-30N manufactured by Tokyo Rikakikai Co., Ltd.) including a capacitor, a thermometer, a water dropping device, and an anchor blade in a water circulating constant temperature vessel at 40° C., a mixed solvent of 180 parts by weight of ethyl acetate and 80 parts by weight of isopropyl alcohol is put in the reaction vessel, and the following composition is added thereto.

Thermosetting polyester resin (PES1): 240 parts by weight
Blocked isocyanate curing agent VESTAGON B-1530 (manufactured by Evonik Industries): 60 parts by weight
Benzoin: 3 parts by weight
Acrylic oligomer (Acronal 4F manufactured by BASF): 3 parts by weight Next, after adding the composition, the mixture is stirred by using a three-one motor at 150 rpm and is dissolved to obtain an oil phase mixture. A mixed solution of 1 part by weight of 10 weight % ammonia aqueous solution and 47 parts by weight of 5 weight % aqueous sodium hydroxide is added dropwise to the oil phase mixture being stirred for 5 minutes and mixed therewith for 10 minutes, and 900 parts by weight of ion exchange water is further added dropwise to the mixture at a rate of 5 parts by weight per minute to perform phase inversion, and an emulsified solution is obtained.

800 parts by weight of the obtained emulsified solution and 700 parts by weight of ion exchange water are put into a 2-liter eggplant flask, and set in an evaporator (manufactured by Tokyo Rikakikai Co., Ltd.) including a vacuum control unit through a trap bump. The mixture is heated in a hot bath at 60° C. while rotating the eggplant flask, the pressure is reduced to 7 kPa while paying attention to bumping, and the solvent is removed. The pressure is returned to the normal pressure when the solvent collection amount becomes 1,100 parts by weight, the eggplant flask is water-cooled, and dispersion is obtained. The obtained dispersion does not have the odor of the solvent. A volume average particle diameter of the composite particles containing the thermosetting polyester resin and the thermosetting agent in this dispersion is 150 nm.

After that, 2% by weight of an anionic surfactant (Dowfax2A1 manufactured by The Dow Chemical Company, 45% by weight of the active ingredients) is added to and mixed with the resin in the dispersion, as an active ingredient, and the ion exchange water is added thereto to adjust the solid content concentration to 20% by weight. This is set as composite particle dispersion (E1) containing the thermosetting polyester resin and the thermosetting agent.

Preparation of Thermosetting Polyester Resin Particle Dispersion (E2)

Thermosetting polyester resin particle dispersion (E2) is obtained under the same conditions as in preparation of the composite particle dispersion (E1), except for setting the amount of the thermosetting polyester resin (PES1) to 300 parts by weight and not adding the blocked isocyanate curing gent, benzoin, and acrylic oligomer.

Preparation of Colored Powder Coating Material (PGE1) Aggregation Step

Composite particle dispersion (E1): 325 parts by weight (solid content: 65 parts by weight)
Colorant dispersion (C1): 3 parts by weight (solid content: 0.75 part by weight)
Colorant dispersion (W1): 150 parts by weight (solid content: 37.5 parts by weight)

The above components are sufficiently mixed and dispersed in a round stainless steel flask using a homogenizer (ULTRA-TURRAX T50 manufactured by IKA Ltd.). Then, the pH is adjusted to 2.5 by using 1.0% nitric acid aqueous solution. 0.50 part by weight of 10% polyaluminum chloride aqueous solution is added thereto, and the dispersion operation is continued with ULTRA-TURRAX.

A stirrer and a mantle heater are installed, the temperature is increased to 50° C. while appropriately adjusting the rotation rate of the stirrer so that the slurry is sufficiently stirred, and the temperature is held for 15 minutes at 50° C. Then, when a volume average particle diameter thereof is 5.5 µm, 100 parts by weight of thermosetting polyester resin particle dispersion (E2) is slowly added thereto.

Coalescence Step

After adding the dispersion, the resultant material is held for 30 minutes. Then, the pH is adjusted to 6.0 using 5% aqueous sodium hydroxide. After that, the resultant material is heated to 85° C., and held for 2 hours. A nearly spheroidized state is observed with an optical microscope.

Filtration•Washing•Drying Step

After completing the reaction, the solution in the flask is cooled and filtered to obtain the solid content. Next, after sufficiently washing this solid content with ion exchange water, solid-liquid separation is performed by Nutsche-type suction filtration, and the solid content is obtained again.

Next, this solid content is dispersed again in 3 liters of ion exchange water at 40° C., and stirred and washed at 300 rpm for 15 minutes. This washing operation is repeated 5 times, and the solid content obtained by solid-liquid separation by Nutsche-type suction filtration is subjected to vacuum drying for 12 hours. Then, 0.5 part by weight of hydrophobic silica particles (primary particle diameter of 16 nm) is mixed as an external additive with respect to 100 parts by weight of solid content, and the colored powder coating material (PCE1) containing the polyester resin is obtained.

Regarding powder particles of the colored powder coating material, the volume average particle diameter D50v is 6.5 µm, the volume average particle size distribution index GSDv is 1.24, and the average circularity is 0.98.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions in the (powder particles of the) colored powder coating material is 0.1% by weight.

Example 3

Colored Powder Coating Material (PCE2) Containing Polyester Resin

Colored powder coating material (PCE2) containing a polyester resin is obtained under the same conditions as in Example 2, except for adding 100 parts by weight of the thermosetting polyester resin particle dispersion (E2), adding 40 parts by weight of 10% nitrilotriacetic acid (NTA) metal salt aqueous solution (Chelest 70 manufactured by Chelest Corporation), and setting the pH to 6.0 by using 5% aqueous sodium hydroxide.

Regarding the powder particles of the colored powder coating material, the volume average particle diameter D50v is 6.8 µm, the volume average particle size distribution index GSDv is 1.22, and the average circularity is 0.99.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.005% by weight.

Example 4

Clear Powder Coating Material (PCA2) Containing Acrylic Resin

Clear powder coating material (PCA2) containing an acrylic resin is obtained under the same conditions as in Example 1, except for changing 1 part by weight of 10% polyaluminum chloride in the aggregation step to 4 parts by weight of 5% magnesium chloride.

Regarding powder particles of the clear powder coating material, the volume average particle diameter D50v is 7.0 µm, the volume average particle size distribution index GSDv is 1.35, and the average circularity is 0.97.

The (powder particles of the) clear powder coating material are buried in an epoxy resin and cut. When an image of the cross section of the powder particle is observed with a transmission electron microscope, the surface of the powder particles coated with the resin coating portion is seen.

The content of magnesium ions of the (powder particles of the) clear powder coating material is 0.17% by weight.

Example 5

Colored Powder Coating Material (PCA3) Containing Acrylic Resin

Preparation of Thermosetting Acrylic Resin Particle Dispersion (A2)

Styrene: 60 parts by weight
Methyl methacrylate: 240 parts by weight
Hydroxyethyl methacrylate: 50 parts by weight
Carboxyethyl acrylate: 18 parts by weight
Glycidyl methacrylate: 260 parts by weight
Dodecanethiol: 8 parts by weight A monomer solution A in which the above components are mixed and dissolved is prepared.

Meanwhile, 12 parts by weight of the anionic surfactant (Dowfax manufactured by The Dow Chemical Company) is dissolved in 280 parts by weight of ion exchange water, and the monomer solution A is added to this, and dispersed and emulsified in a flask, and accordingly a solution (monomer emulsified solution A) is obtained.

Next, 1 part by weight of the anionic surfactant (Dowfax manufactured by The Dow Chemical Company) is dissolved in 555 parts by weight of ion exchange water and is put in a flask for polymerization. After that, the flask for polymerization is tightly closed, a reflux tube is installed to introduce nitrogen, and the flask for polymerization is heated to 75° C. in a water bath while slowly stirring, and held in this state.

In this state, a solution obtained by dissolving 9 parts by weight of ammonium persulfate in 43 parts by weight of ion exchange water is added dropwise into the flask for polymerization through a metering pump for 20 minutes, and then the monomer emulsified solution A is added dropwise thereto through the metering pump for 200 minutes. After completing the dropwise adding, the flask for polymerization is held at 75° C. for 3 hours while continuously slowly stirring to complete the polymerization, and anionic thermosetting acrylic resin particle dispersion (A2) having a solid content of 42% is obtained.

Regarding the thermosetting acrylic resin particles contained in the anionic thermosetting acrylic resin particle dispersion (A2), the volume average particle diameter is 200 nm, the glass transition temperature is 65° C., and the weight average molecular weight is 31,000.

Preparation of Colored Powder Coating Material (PCA3)

Aggregation Step

Thermosetting acrylic resin particle dispersion (A2): 155 parts by weight (solid content: 65 parts by weight)

Colorant dispersion (C1): 3 parts by weight (solid content: 0.75 part by weight)

Colorant dispersion (W1): 150 parts by weight (solid content: 37.5 parts by weight)

The above components are sufficiently mixed and dispersed in a round stainless steel flask using a homogenizer (ULTRA-TURRAX T50 manufactured by IKA Ltd.). Then, the pH is adjusted to 2.5 by using 1.0% nitric acid aqueous solution. 0.70 part by weight of 10% polyaluminum chloride aqueous solution is added thereto, and the dispersion operation is continued with the ULTRA-TURRAX.

A stirrer and a mantle heater are installed, the temperature is increased to 60° C. while appropriately adjusting the rotation rate of the stirrer so that the slurry is sufficiently stirred, and the temperature is held for 15 minutes at 60° C. Then, when a volume average particle diameter thereof is 9.5 μm, 100 parts by weight of thermosetting acrylic resin particle dispersion (A2) is slowly added thereto.

Coalescence Step

After adding the dispersion, the resultant material is held for 30 minutes. Then, pH is adjusted to 5.0 using 5% aqueous sodium hydroxide. After that, the resultant material is heated to 90° C., and held for 2 hours. A nearly spheroidized state is observed with an optical microscope.

Filtration•Washing•Drying Step

After completing the reaction, the solution in the flask is cooled and filtrated to obtain the solid content. Next, after sufficiently washing this solid content with ion exchange water, solid-liquid separation is performed by Nutsche-type suction filtration, and the solid content is obtained again.

Next, this solid content is dispersed again in 3 liters of ion exchange water at 40° C., and stirred and washed at 300 rpm for 15 minutes. This washing operation is repeated 5 times, and the solid content obtained by solid-liquid separation by Nutsche-type suction filtration is subjected to vacuum drying for 12 hours. Then, 0.5 part by weight of hydrophobic silica particles (primary particle diameter of 16 nm) is mixed with respect to 100 parts by weight of solid content, and the colored powder coating material (PCA3) containing the acrylic resin is obtained.

Regarding powder particles of the colored powder coating material, the volume average particle diameter D50v is 13.5 μm, the volume average particle size distribution index GSDv is 1.23, and the average circularity is 0.98.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.03% by weight.

Example 6

Colored Powder Coating Material (PCE3) Containing Polyester Resin

Preparation of Thermosetting Polyester Resin (PES2)

Raw materials having the following composition are put in a reaction vessel including a stirrer, a thermometer, a nitrogen gas introducing tube, and a rectifier, heated to 240° C. while stirring under a nitrogen atmosphere, and subjected to a polycondensation reaction.

Terephthalic acid: 494 parts by weight (70 mol %)
Isophthalic acid: 212 parts by weight (30 mol %)
Neopentyl glycol: 421 parts by weight (88 mol %)
Ethylene glycol: 28 parts by weight (10 mol %)
Trimethylolethane: 11 parts by weight (2 mol %)
di-n-butyl tin oxide: 0.5 part by weight Regarding the obtained thermosetting polyester resin, the glass transition temperature is 60° C., the acid value (Av) is 7 mgKOH/g, the hydroxyl value (OHv) is 35 mgKOH/g, the weight average molecular weight is 22,000, and the number average molecular weight is 7,000.

Preparation of Composite Particle Dispersion (E3)

While maintaining a 3-liter jacketed reaction vessel (BJ-30N manufactured by Tokyo Rikakikai Co., Ltd.) including a capacitor, a thermometer, a water dropping device, and an anchor blade in a water circulating constant temperature vessel at 40° C., a mixed solvent of 180 parts by weight of ethyl acetate and 80 parts by weight of isopropyl alcohol is put in the reaction vessel, and the following composition is added thereto.

Thermosetting polyester resin (PES2): 240 parts by weight
Blocked isocyanate curing agent VESTAGON B-1530 (manufactured by Evonik Industries): 60 parts by weight
Benzoin: 3 parts by weight
Acrylic oligomer (Acronal 4F manufactured by BASF): 3 parts by weight Next, after adding the composition, the mixture is stirred by using a three-one motor at 150 rpm and is dissolved to obtain an oil phase mixture. A mixed solution of 1 part by weight of 10 weight % ammonia aqueous solution and 97 parts by weight of 5 weight % aqueous sodium hydroxide is added dropwise to the oil phase mixture being stirred for 5 minutes and mixed therewith for 10 minutes, and 900 parts by weight of ion exchange water is further added dropwise to the mixture at a rate of 5 parts by weight per minute to perform phase inversion, and an emulsified solution is obtained.

800 parts by weight of the obtained emulsified solution and 700 parts by weight of ion exchange water are put in a 2-liter eggplant flask, and set in an evaporator (manufactured by Tokyo Rikakikai Co., Ltd.) including a vacuum control unit through a trap bump. The mixture is heated in a hot bath at 60° C. while rotating the eggplant flask, the pressure is reduced to 7 kPa while paying attention to bumping, and the solvent is removed. The pressure is returned to the normal pressure when the solvent collection amount becomes 1,100 parts by weight, the eggplant flask is water-cooled, and dispersion is obtained. The obtained dispersion does not have the odor of the solvent. The volume average particle diameter of the composite particles containing the thermosetting polyester resin and the thermosetting agent in this dispersion is 160 nm.

After that, 2% by weight of anionic surfactant (Dowfax2A1 manufactured by The Dow Chemical Company, 45% by weight of the active ingredients) is added to and mixed with the resin in the dispersion, as an active ingredient, and the ion exchange water is added thereto to adjust the solid content concentration to 20% by weight. This is set as composite particle dispersion (E3) containing the thermosetting polyester resin and the thermosetting agent.

Preparation of Thermosetting Polyester Resin Particle Dispersion (E4)

Thermosetting polyester resin particle dispersion (E4) is obtained under the same conditions as in preparation of the composite particle dispersion (E1), except for setting the amount of the thermosetting polyester resin (PES2) to 300 parts by weight and not adding the blocked isocyanate curing agent, benzoin, and acrylic oligomer.

Preparation of Colored Powder Coating Material (PCE3)

Aggregation Step

Composite particle dispersion (E3): 325 parts by weight (solid content: 65 parts by weight)

Colorant dispersion (C1): 3 parts by weight (solid content: 0.75 part by weight)

Colorant dispersion (W1): 150 parts by weight (solid content: 37.5 parts by weight)

The above components are sufficiently mixed and dispersed in a round stainless steel flask using a homogenizer (ULTRA-TURRAX T50 manufactured by IKA Ltd.). Then, the pH is adjusted to 2.5 by using 1.0% nitric acid aqueous solution. 0.50 part by weight of 10% polyaluminum chloride aqueous solution is added thereto, and the dispersion operation is continued with the ULTRA-TURRAX.

A stirrer and a mantle heater are installed, the temperature is increased to 40° C. while appropriately adjusting the rotation rate of the stirrer so that the slurry is sufficiently stirred, and the temperature is held for 15 minutes at 40° C. Then, when the volume average particle diameter thereof is 3.5 µm, 100 parts by weight of thermosetting polyester resin particle dispersion (E4) is slowly added thereto.

Coalescence Step

After adding the dispersion, the resultant material is held for 30 minutes. Then, the pH is adjusted to 6.0 using 5% aqueous sodium hydroxide. After that, the resultant material is heated to 85° C., and held for 2 hours. A nearly spheroidized state is observed with an optical microscope.

Filtration•Washing•Drying Step

After completing the reaction, the solution in the flask is cooled and filtered to obtain the solid content. Next, after sufficiently washing this solid content with ion exchange water, solid-liquid separation is performed by Nutsche-type suction filtration, and the solid content is obtained again.

Next, this solid content is dispersed again in 3 liters of ion exchange water at 40° C., and stirred and washed at 300 rpm for 15 minutes. This washing operation is repeated 5 times, and the solid content obtained by solid-liquid separation by Nutsche-type suction filtration is subjected to vacuum drying for 12 hours. Then, 0.5 part by weight of hydrophobic silica particles (primary particle diameter of 16 nm) is mixed with respect to 100 parts by weight of solid content, and the colored powder coating material (PCE3) containing the polyester resin is obtained.

Regarding powder particles of the colored powder coating material, the volume average particle diameter D50v is 4.5 µm, the volume average particle size distribution index GSDv is 1.23, and the average circularity is 0.99.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.02% by weight.

Comparative Example 1

Colored Powder Coating Material (PCEX1) Containing Polyester Resin

Colored powder coating material (PCEX1) containing a polyester resin is obtained under the same conditions as in Example 2, except for setting the amount of the composite particle dispersion (E1) to 400 parts by weight and not adding 100 parts by weight of the thermosetting polyester resin particle dispersion (E2).

Regarding the powder particles of the colored powder coating material, the volume average particle diameter D50v is 7.5 µm, the volume average particle size distribution index GSDv is 1.40, and the average circularity is 0.98.

The (powder particles of the) colored powder coating material are buried in an epoxy resin and cut. When an image of the cross section of the powder particle is observed with a transmission electron microscope, the surface of the powder particle is not coated with the resin coating portion, and the exposure of the additive considered as the thermosetting agent to the surface of the powder particles is seen.

The content of aluminum ions of the (powder particles of the) colored powder coating material is 0.07% by weight.

Comparative Example 2

Clear Powder Coating Material (PCAX1) Containing Acrylic Resin

Clear powder coating material (PCAX1) containing an acrylic resin is obtained under the same conditions as in Example 1, except for decreasing the amount of polyaluminum chloride to 0.1 part by weight, adding 40 parts by weight of 10% nitrilotriacetic acid (NTA) metal salt aqueous solution (Chelest 70 manufactured by Chelest Corporation) in the coalescence step, and adjusting the pH to 6.0 using 5% aqueous sodium hydroxide.

Regarding powder particles of the clear powder coating material, the volume average particle diameter D50v is 9.0 µm, the volume average particle size distribution index GSDv is 1.53, and the average circularity is 0.99.

The (powder particles of the) clear powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) clear powder coating material is 0.001% by weight.

Comparative Example 3

Clear Powder Coating Material (PCAX2) Containing Acrylic Resin

Clear powder coating material (PCAX2) containing an acrylic resin is obtained under the same conditions as in Example 1, except for increasing the amount of polyaluminum chloride to 3 parts by weight.

Regarding powder particles of the clear powder coating material, the volume average particle diameter D50v is 8.2 µm, the volume average particle size distribution index GSDv is 1.30, and the average circularity is 0.95.

The (powder particles of the) clear powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) clear powder coating material is 0.25% by weight.

Comparative Example 4

Colored Powder Coating Material (PCEX2) Containing Polyester Resin

Colored powder coating material (PCEX2) containing a polyester resin is obtained under the same conditions as in Example 6, except for decreasing the amount of polyaluminum chloride to 0.2 part by weight, adding 40 parts by weight of 10% nitrilotriacetic acid (NTA) metal salt aqueous solution (Chelest 70 manufactured by Chelest Corporation) in the coalescence step, and adjusting the pH to 6.0 using 5% aqueous sodium hydroxide. Regarding powder particles of the colored powder coating material, the volume average particle diameter D50v is 5.0 μm, the volume average particle size distribution index GSDv is 1.55, and the average circularity is 0.99.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.0016% by weight.

Example 7

Colored Powder Coating Material (PCE4) Containing Polyester Resin

Colored powder coating material (PCE4) containing a polyester resin is obtained under the same conditions as in Example 6, except for increasing the amount of polyaluminum chloride to 2 parts by weight.

Regarding powder particles of the colored powder coating material, the volume average particle diameter D50v is 5.5 μm, the volume average particle size distribution index GSDv is 1.30, and the average circularity is 0.97.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.22% by weight.

Example 8

Colored Powder Coating Material (PME1) Containing Polyester Resin

Colored powder coating material (PME1) is obtained by the same method as that of the colored powder coating material (PCE1) in Example 2, except for setting the amount of composite particle dispersion (E1) to 306.5 parts by weight and using 4.8 parts by weight of the colorant dispersion (M1) instead of the colorant dispersion (C1).

Regarding powder particles of the colored powder coating material, the volume average particle diameter D50v is 6.4 μm, the volume average particle size distribution index GSDv is 1.23, and the average circularity is 0.98.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.1% by weight.

Example 9

Colored Powder Coating Material (PME2) Containing Polyester Resin

Colored powder coating material (PME2) is obtained by the same method as that of the colored powder coating material (PCE1) in Example 2, except for setting the amount of composite particle dispersion (E1) to 305 parts by weight and using 6 parts by weight of the colorant dispersion (M2) instead of the colorant dispersion (C1).

Regarding the powder particles of the colored powder coating material, the volume average particle diameter D50v is 6.6 μm, the volume average particle size distribution index GSDv is 1.22, and the average circularity is 0.98.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the powder particles of the colored powder coating material is 0.1% by weight.

Example 10

Colored Powder Coating Material (PYE1) Containing Polyester Resin

Colored powder coating material (PYE1) is obtained by the same method as that of the colored powder coating material (PCE1) in Example 2, except for setting the amount of composite particle dispersion (E1) to 302.5 parts by weight and using 8 parts by weight of the colorant dispersion (Y1) instead of the colorant dispersion (C1).

Regarding powder particles of the colored powder coating material, the volume average particle diameter D50v is 6.8 μm, the volume average particle size distribution index GSDv is 1.24, and the average circularity is 0.96.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.12% by weight.

Example 11

Colored Powder Coating Material (PKE1) Containing Polyester Resin

Colored powder coating material (PKE1) is obtained by the same method as that of the colored powder coating material (PCE1) in Example 2, except for setting the amount of composite particle dispersion (E1) to 309 parts by weight and using 2.8 parts by weight of the colorant dispersion (K1) instead of the colorant dispersion (C1).

Regarding powder particles of the colored powder coating material, the volume average particle diameter D50v is 6.5 μm, the volume average particle size distribution index GSDv is 1.22, and the average circularity is 0.98.

The (powder particles of the) colored powder coating material are buried in an epoxy resin and cut. When an image of the cross section of the powder particle is observed with a transmission electron microscope, the surface of the powder particles coated with the resin coating portion is seen.

The content of aluminum ions of the (powder particles of the) colored powder coating material is 0.09% by weight.

Evaluation

Manufacturing of Coating Film Sample of Powder Coating Material

The powder coating material obtained in each example is coated on a test panel of zinc phosphate-treated steel by an electrostatic coating method or the like, and heated (burned) at a heating temperature of 180° C. for a heating time of 1 hour, and a coating film sample having a thickness of 30 μm is obtained.

(Micro-Tri-Glossmeter manufactured by BYK Gardner). A high value indicates high glossiness, and a value equal to or greater than 90% is considered to be good.

Evaluation of Blocking Resistance

After storing the powder coating material obtained in each example for 17 hours in a thermo-hygrostat bath in which the temperature is controlled to 50° C. and humidity is controlled to 50RH %, an amount passing through 200 mesh (aperture of 75 microns) is examined by using a vibration screen, and evaluated based on the following criteria.

G1 (O): Passed amount is equal to or greater than 90%

NG (X): Passed amount is less than 90%

The details and evaluation results of each example will be shown in Table 1.

TABLE 1

| | | Ex. 1 | Ex. 2 | Ex. 3 | Ex. 4 | Com. Ex. 1 | Com. Ex. 2 | Com. Ex. 3 |
|---|---|---|---|---|---|---|---|---|
| Properties of powder coating material | Sample ID | PCA1 | PCE1 | PCE2 | PCA2 | PCEX1 | PCAX1 | PCAX2 |
| | D50v (μm) | 5.9 | 6.5 | 6.8 | 7.0 | 7.5 | 9.0 | 8.2 |
| | GSDv | 1.20 | 1.24 | 1.22 | 1.35 | 1.40 | 1.53 | 1.30 |
| | Average circularity | 0.99 | 0.98 | 0.99 | 0.97 | 0.98 | 0.99 | 0.95 |
| | Resin coating portion | Observed | Observed | Observed | Observed | None | Observed | Observed |
| | Content of metal ions (%) | 0.08 | 0.1 | 0.005 | 0.17 | 0.07 | 0.001 | 0.25 |
| Evaluation | Surface roughness Ra of coating film (μm) | 0.3 | 0.3 | 0.2 | 0.4 | 0.6 | 0.7 | 0.8 |
| | Glossiness % of coating film | 96 | 95 | 97 | 95 | 92 | 87 | 77 |
| | Blocking resistance of powder coating material | G1(O) | G1(O) | G1(O) | G1(O) | NG(X) | G1(O) | G1(O) |

| | | Ex. 5 | Ex. 6 | Com. Ex. 4 | Ex. 7 | Ex. 8 | Ex. 9 | Ex. 10 | Ex. 11 |
|---|---|---|---|---|---|---|---|---|---|
| Properties of powder coating material | Sample ID | PCA3 | PCE3 | PCEX2 | PCE4 | PME1 | PME2 | PYE1 | PKE1 |
| | D50v (μm) | 13.5 | 4.5 | 5.0 | 5.5 | 6.4 | 6.6 | 6.8 | 6.5 |
| | GSDv | 1.23 | 1.23 | 1.55 | 1.30 | 1.23 | 1.22 | 1.24 | 1.22 |
| | Average circularity | 0.98 | 0.99 | 0.99 | 0.97 | 0.98 | 0.98 | 0.96 | 0.98 |
| | Resin coating portion | Observed | Observed | Observed | Observed | Observed | Observed | Observed | Observed |
| | Content of metal ions (%) | 0.03 | 0.02 | 0.0016 | 0.22 | 0.1 | 0.1 | 0.12 | 0.09 |
| Evaluation | Surface roughness Ra of coating film (μm) | 0.3 | 0.1 | 0.3 | 0.6 | 0.3 | 0.3 | 0.4 | 0.2 |
| | Glossiness % of coating film | 95 | 98 | 95 | 90 | 95 | 94 | 91 | 95 |
| | Blocking resistance of powder coating material | G1(O) | G1(O) | NG(X) | G1(O) | G1(O) | G1(O) | G1(O) | G1(O) |

Evaluation of Smoothness of Coating Film

A center line average roughness (hereinafter, noted as "Ra", unit: μm) of the surface of the coating film sample is measured by using a surface roughness measuring device (SURFCOM 1400A manufactured by Tokyo Seimitsu Co., Ltd.) A high value of Ra indicates low surface smoothness, and a value of 0.5 is considered to be good.

Evaluation of Glossiness of Coating Film

A specular gloss value at 60° (unit: %) of the surface of the coating film sample is measured by using a glossmeter From the above results, in the examples, it is found that a coating film having low surface roughness and high glossiness is obtained, even when the volume average particle diameter is decreased to 15 μm or less, compared to the comparative examples. In addition, in the examples, it is found that blocking resistance of the powder coating material is excellent, compared to the comparative examples.

Therefore, it is found that, the powder coating material of the examples forms a coating film having high smoothness with a small amount of the powder coating material and has high storability, even when a diameter of a powder particle is decreased, compared to the powder coating material of the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising:
   powder particles that contain:
   a core containing a thermosetting resin and a thermosetting agent; and
   a resin coating portion for coating a surface of the core, and
   of which a volume particle size distribution index GSDv is equal to or smaller than 1.50, and
   an average circularity is equal to or greater than 0.96,
   wherein the powder particles contain di- or higher-valent metal ions, and
   wherein a content of the di- or higher-valent metal ions is from 0.002% by weight to 0.2% by weight with respect to the entirety of the powder particles.

2. The thermosetting powder coating material according to claim 1,
   wherein the di- or higher-valent metal ions are at least one kind selected from the group consisting of aluminum ions, magnesium ions, iron ions, zinc ions, and calcium ions.

3. The thermosetting powder coating material according to claim 1,
   wherein the thermosetting resin and a resin of the resin coating portion are at least one kind selected from the group consisting of a thermosetting acrylic resin and a thermosetting polyester resin.

4. The thermosetting powder coating material according to claim 3,
   wherein a number average molecular weight of the thermosetting acrylic resin is from 1,000 to 20,000.

5. The thermosetting powder coating material according to claim 3,
   wherein a number average molecular weight of the thermosetting polyester resin is from 1,000 to 100,000.

6. The thermosetting powder coating material according to claim 3,
   wherein the total of an acid value and a hydroxyl value of the thermosetting polyester resin is from 10 mgKOH/g to 250 mgKOH/g.

7. The thermosetting powder coating material according to claim 1,
   wherein a coverage of the resin coating portion is from 30% to 100%.

8. The thermosetting powder coating material according to claim 1,
   wherein a thickness of the resin coating portion is from 0.2 µm to 4 µm.

9. The thermosetting powder coating material according to claim 1, further comprising inorganic particles on the surface.

10. The thermosetting powder coating material according to claim 9,
    wherein an added amount of the inorganic particles is from 0.01% by weight to 5% by weight with respect to the powder particles.

11. The thermosetting powder coating material according to claim 1, further comprising two or more kinds of colorants,
    wherein one kind of the colorants is a white colorant.

12. A coated article that is coated with the thermosetting powder coating material according to claim 1.

13. The coated article according to claim 12,
    wherein a thickness of a coating film is from 30 µm to 50 µm.

* * * * *